G. J. LANGE.
BEAN HULLING DEVICE.
APPLICATION FILED MAR. 9, 1912.
1,067,745.
Patented July 15, 1913.
2 SHEETS—SHEET 1.
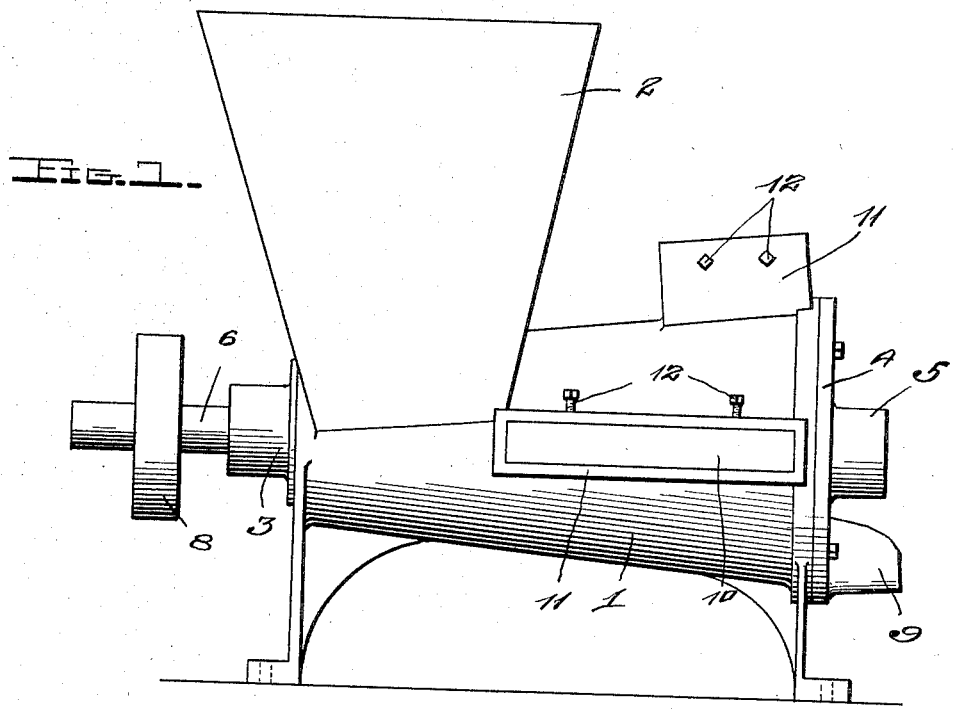
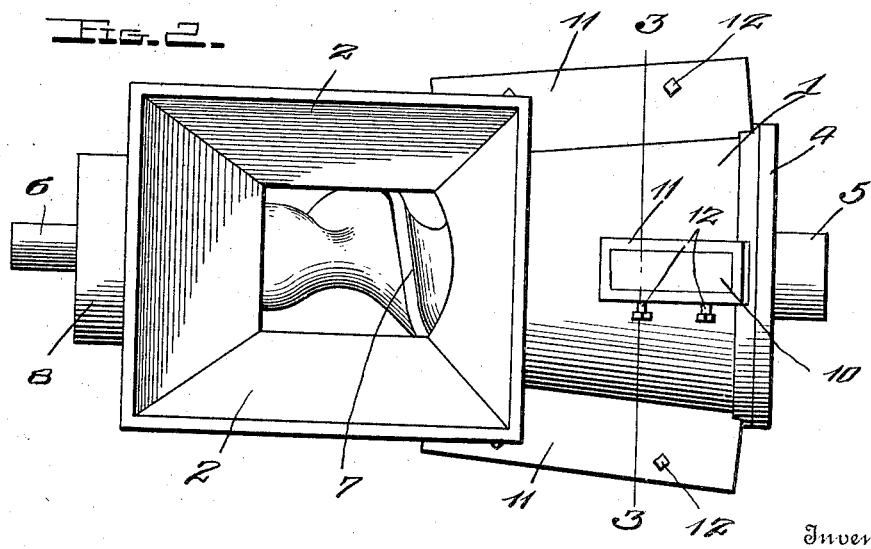
Witnesses
Chas. L. Griestaur.
G. B. Norton.
Inventor
G. J. Lange,
By Watson E. Coleman
Attorney G. J. LANGE.
BEAN HULLING DEVICE.
APPLICATION FILED MAR. 9, 1912.
1,067,745.
Patented July 15, 1913.
2 SHEETS—SHEET 2.
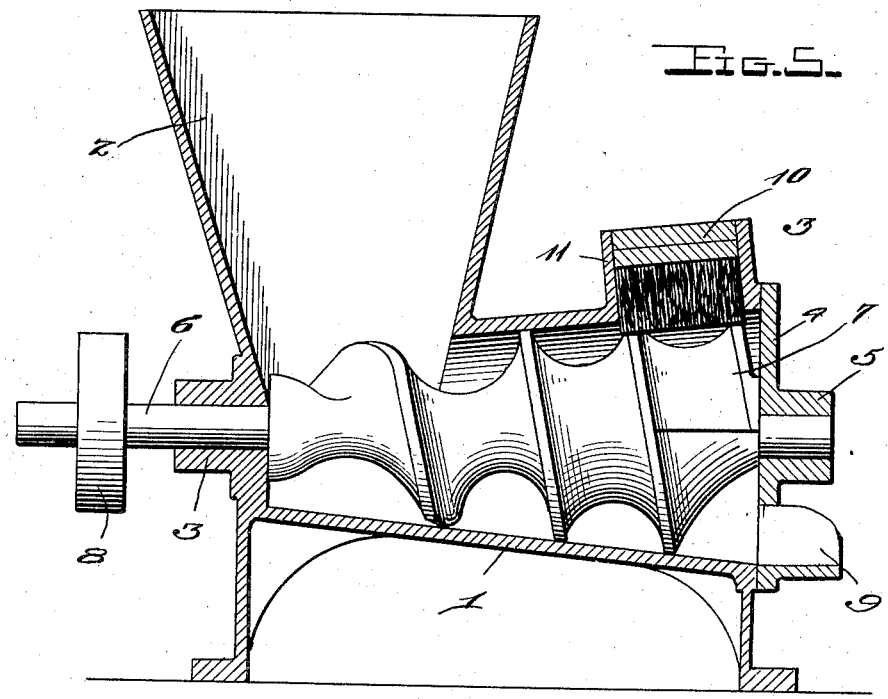
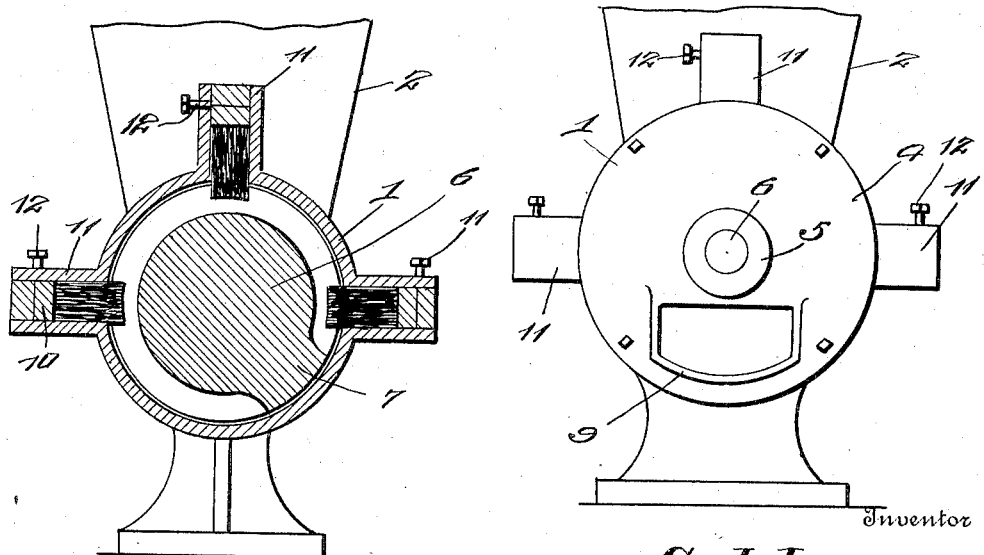
Witnesses
Chas. L. Griesbauer.
A. B. Norton.
Inventor
G. J. Lange,
By Watson E. Coleman
Attorney

UNITED STATES PATENT OFFICE.

GUSTAV J. LANGE, OF EAU CLAIRE, WISCONSIN.

BEAN-HULLING DEVICE.

1,067,745.

Specification of Letters Patent.

Patented July 15, 1913.

Application filed March 9, 1912. Serial No. 682,591.

*To all whom it may concern:*

Be it known that I, GUSTAV J. LANGE, a citizen of the United States, residing at Eau Claire, in the county of Eau Claire and State of Wisconsin, have invented certain new and useful Improvements in Bean-Hulling Devices, of which the following is a specification, reference being had to the accompanying drawings.

This invention relates to new and useful improvements in hulling devices and more particularly to a device for hulling beans and the like and my object is to provide a device of this character which will remove the hulls from beans and the like without injuring the product whatsoever.

A further object of the invention resides in providing a device provided with a spiral screw for causing the product to be passed from one end of the device to the other and still another object resides in providing a plurality of brushes, the bristles of which are adapted to contact with the product being conveyed by the spiral screw so as to remove the hulls therefrom.

Still another object of the invention resides in providing a device which is extremely simple and durable in construction, inexpensive to manufacture and one which will be very efficient in operation.

With these and other objects in view, the invention consists in the novel features of construction, combination and arrangement of parts as will be hereinafter referred to and more particularly pointed out in the specification and claim.

In the accompanying drawings forming a part of this application, Figure 1 is a side elevation of the device. Fig. 2 is a top plan view thereof. Fig. 3 is a vertical transverse section therethrough, as seen on the line 3—3, Fig. 2; Fig. 4 is an end elevation of the device; and Fig. 5 is a vertical longitudinal section through the device.

In describing my invention, I shall refer to the drawings in which similar reference characters designate corresponding parts throughout the several views, and in which—

1 indicates a housing or casing of any suitable size and shape adapted to be supported above a floor and into the upper portion of which adjacent one end, is mounted a hopper 2 adapted to receive the product to be hulled. This housing 1 which is preferably circular in cross section and tapered toward the rear end thereof is provided with the removable heads 3 and 4 which have the alining bearings 5 formed therein, said bearings rotatably receiving therethrough a shaft 6 having a spiral screw 7 formed thereon. This spiral screw 7 is entirely inclosed within the housing 1 and the shaft carrying the same is adapted to be revolved through the medium of a pulley 8 having connection with any desired source of power (not shown) so that the product which is conveyed to said housing through the hopper 2 may be conducted to the rear end of the housing to be passed through an outlet opening 9 formed in the head 4. This product, which is in most instances beans, is preferably soaked previous to the entrance of the same in the housing so that the hulls thereon may be readily removed and in order to provide means to remove said hulls from the product as the latter is directed through the housing, I provide a plurality of brushes 10. These brushes are extended through slots or the like formed in the top and sides of the housing 1, the latter being provided with the guide flanges 11 adjacent the openings or slots therein, to form channel-ways for said brushes and set screws 12 extending through said flanges are adapted to form means whereby said brushes may be adjustably held in position in the housing. Transversely extending flanges 11' are formed on the housing adjacent the opposite ends of the slots, the flanges 11' connecting the longitudinal flanges and forming end walls for the channel ways, and the distance between the opposed faces of the flanges 11' is substantially the same as the length of the heads of the brushes 10. The flanges 11' are inclined rearwardly, so that the brushes will project within the casing the same distance for their entire length whereby the pressure of the brushes against the beans will be the same the entire length of the brushes. The bristles of these brushes which are formed preferably of wire will, of course, project within the housing to points adjacent the screw 7 so that as said screw revolves to cause the product to be conveyed toward the one end of said housing, said product will contact with the bristles, thereby removing the hulls therefrom and thus the product and hulls will be conveyed together to the discharge end of the housing.

It will be appreciated that in view of the adjustability of the brushes 10 in the housing, the same may be moved inwardly or outwardly to compensate for the different amounts of the product which are being conveyed from the hopper to the discharge end of the housing and after the hulled product, together with the hulls, is discharged through the opening 9 in the head 4, the same may be conveyed to any desired device, such as a separating machine.

From the foregoing it will be seen that I have provided a simple, inexpensive and efficient means for carrying out the objects of my invention, and while I have particularly described the elements best adapted to perform the functions set forth, it will be obvious that various changes in form, proportion and in the minor details of construction may be resorted to without departing from the spirit or sacrificing any of the novel features of the invention.

Having thus described my invention, what I claim is:—

A hulling device of the character described, comprising a cylindrical casing having an outlet opening in one end thereof and also provided with longitudinally extending slots in the sides and top thereof, a hopper mounted in said casing adjacent the opposite end in which the outlet opening is formed, a tapered spiral screw extending longitudinally of the casing and rotatably mounted therein, longitudinal flanges formed on said housing adjacent the slots therein to form channel ways, rearwardly inclined transversely extending flanges connecting said longitudinal flanges to form end walls for said channel ways, longitudinally extending scraping brushes adjustably mounted in said channel ways in the casing, said cylindrical casing being tapered to substantially the same distance as the tapered screw, substantially as and for the purpose described.

In testimony whereof I hereunto affix my signature in the presence of two witnesses.

GUSTAV J. LANGE.

Witnesses:
 J. G. YOUNG,
 C. W. HAYES.

---

Copies of this patent may be obtained for five cents each, by addressing the "Commissioner of Patents, Washington, D. C."